(12) United States Patent
Gharsalli et al.

(10) Patent No.: US 8,060,299 B2
(45) Date of Patent: Nov. 15, 2011

(54) MACHINE WITH AUTOMATED STEERING SYSTEM

(75) Inventors: Imed Gharsalli, Brimfield, IL (US); Vivek Bhaskar, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 778 days.

(21) Appl. No.: 11/711,724

(22) Filed: Feb. 28, 2007

(65) Prior Publication Data

US 2008/0208461 A1 Aug. 28, 2008

(51) Int. Cl.
*G01C 21/00* (2006.01)
*G01S 19/42* (2010.01)
*G06F 19/00* (2006.01)

(52) U.S. Cl. ........ 701/209; 701/41; 701/50; 340/991.19

(58) Field of Classification Search .................. 701/209, 701/210, 50, 23, 25, 26, 28, 207, 41; 340/995.19; 342/357.17; 56/10.2 A; 172/5; 180/168
See application file for complete search history.

(56) References Cited

U.S. PATENT DOCUMENTS

| | | | | |
|---|---|---|---|---|
| 5,987,383 A * | 11/1999 | Keller et al. | .................. | 701/213 |
| 6,088,644 A | 7/2000 | Brandt et al. | | |
| 6,095,254 A * | 8/2000 | Homburg | ............. | 172/6 |
| 6,128,574 A * | 10/2000 | Diekhans | .............. | 701/209 |
| 6,141,614 A | 10/2000 | Janzen et al. | | |
| 6,236,924 B1 * | 5/2001 | Motz et al. | ...................... | 701/50 |
| 6,336,051 B1 | 1/2002 | Pangels et al. | | |
| 6,539,303 B2 | 3/2003 | McClure et al. | | |
| 6,549,849 B2 * | 4/2003 | Lange et al. | .................. | 701/213 |
| 6,711,501 B2 | 3/2004 | McClure et al. | | |
| 6,907,336 B2 | 6/2005 | Gray et al. | | |
| 6,934,615 B2 * | 8/2005 | Flann et al. | ...................... | 701/50 |
| 7,010,425 B2 | 3/2006 | Gray et al. | | |
| 7,142,956 B2 | 11/2006 | Heiniger et al. | | |
| 7,363,154 B2 * | 4/2008 | Lindores | ....................... | 701/210 |
| 7,451,030 B2 * | 11/2008 | Eglington et al. | .............. | 701/50 |
| 7,835,832 B2 * | 11/2010 | Macdonald et al. | ........... | 701/24 |
| 2006/0064216 A1 * | 3/2006 | Palmer | ............................ | 701/41 |
| 2006/0178820 A1 | 8/2006 | Eglington et al. | | |
| 2007/0168116 A1 * | 7/2007 | Meyer zu Helligen et al. | ............................ | 701/201 |
| 2008/0103694 A1 * | 5/2008 | Dix et al. | ...................... | 701/213 |
| 2009/0118904 A1 * | 5/2009 | Birnie | .............................. | 701/41 |
| 2010/0185366 A1 * | 7/2010 | Heiniger et al. | ................ | 701/50 |

FOREIGN PATENT DOCUMENTS

WO    WO 98/46065    10/1998

* cited by examiner

*Primary Examiner* — Tan Q Nguyen
(74) *Attorney, Agent, or Firm* — Finnegan, Henderson, Farabow, Garrett & Dunner LLP

(57) ABSTRACT

A system is provided for regulating a travel course of a machine. The system has a steering system operationally connected to at least one ground engaging device. Additionally, the system has a path generator configured to generate a path along which the machine can travel. The system also has a path tracker configured to automatically regulate the steering system to position the machine within a predetermined vicinity of an initial point on the generated path and guide the machine along the generated path.

18 Claims, 7 Drawing Sheets

| VERTEX | EDGE | # OF PASSES | LENGTH OF PASS |
|---|---|---|---|
| A | A,B | 8 | 150 ft |
| B | B,C | 24 | 44 ft |
| C | C,D | 8 | 150 ft |
| D | D,A | 24 | 44 ft |

MACHINE WITH AUTOMATED STEERING SYSTEM

TECHNICAL FIELD

The present disclosure is directed to a machine having a steering system, and more particularly, to an automated steering system capable of generating a travel path for the machine.

BACKGROUND

Motor graders are used primarily as a finishing tool to sculpt a surface of a construction site to a final shape and contour. Typically, motor graders include many hand-operated controls to steer the wheels of the grader, position a blade, and articulate the front frame of the grader. The blade is adjustably mounted to the front frame to move relatively small quantities of earth from side to side. The articulation angle is adjusted by rotating the front frame of the grader relative to the rear frame of the grader.

While preparing the subsurface of, for example, a parking lot, highway, or golf course, it is desirable to ensure the accuracy of the boundary and contour of the work area. A motor grader may make multiple passes back and forth across the work area in order to completely cover an entire region within the boundary. Each of these passes may involve check points spaced out at regular intervals that define a straight path with a 180 degree turn at the end thereof. Furthermore, each pass is offset by a certain amount from the previous pass. To produce a variety of surface geometries at a construction site, the blade and the frame may be adjusted by an operator to many different positions. Positioning the blade of a motor grader is a complex and time-consuming task and is difficult to do when making complicated cuts or contouring surfaces, and to do so while also steering the grader.

Because grading tasks are complicated and time-consuming, it is difficult for the operator to simultaneously accomplish all of the tasks necessary for finely grading a complex work site. The operator must control machine trajectory, the complexity of which may increase with increasing numbers of passes and turns. Furthermore, the operator must control surface elevations, angles, and cut depths. The difficulty of such operations may reduce the productivity and efficiency of the operator.

One way to simplify operator control and allow focusing on the sculpting performed by the blade is to autonomously steer the machine. One example is U.S. Pat. No. 6,907,336 issued to Gray et al. (Gray) on Jun. 14, 2005. Gray discloses a machine that generates a travel path and then uses a navigation system to follow the generated path. The system in the Gray patent has a vehicular guidance system and a path planner. The path planner includes a creator, which creates a machine travel row transparency based on user input and places it over a mapped area. The mapped area represents the work area of the vehicle, and the travel rows represent the path over which the machine will travel while grading the work area. The path planner also includes a splitter, which splits the travel rows into sections defined by the intersections of travel rows and the boundary of the work area. Nodes are created at the section boundaries signifying the beginning or termination of work along each travel path. A data processor identifies and locates each node and determines the most efficient path by interconnecting the nodes in a continuously looping line. Once the path is created and the coordinates of the path are determined, the system uses the navigation system to steer the vehicle through the generated path.

Although the system in the Gray patent generates a path along which the motor grader is automatically driven, the path is based on a pre-made map of the work site. Because the Grey system relies on pre-made maps, the number and variety of work sites open to automatic steering may be limited by the inventory of maps. In addition, the storage of such pre-made maps can require additional memory, adding to the cost of the system.

Additionally, the system in the Gray patent offers only one possible path based on the least number of passes required to traverse the work site. Although this one path may be the optimal path for some work sites, it may provide a suboptimal path for others. For example, the most optimal path for a particular work site may be based on the starting point of the path rather than the number of passes traversing the work site. If the path is designed based on the minimal number of passes, it might be suboptimal because it may originate at an undesired point. Furthermore, it might be impossible to fully sculpt the work site along a particular path because of obstructions omitted from the stored map.

Furthermore, the system in Gray fails to ensure that the motor grader is placed within the vicinity of the initial position and orientation suggested by the path. Without an automatic mechanism for initially positioning the motor grader, the grading process may begin with the motor grader misaligned. Any deviation from the path caused by the misalignment may cause errors in the grading. Such generated errors may require corresponding corrections leading to decreased efficiency and increased construction costs.

The disclosed automated steering system is directed to overcoming one or more of the problems set forth above.

SUMMARY OF THE INVENTION

In one aspect, the present disclosure is directed toward a system for regulating a travel course of a machine. The system includes a steering system operationally connected to at least one ground engaging traction device. Additionally, the system includes a path generator configured to generate a path along which the machine can travel. The system further includes a path tracker configured to automatically regulate the steering system to position the machine within a predetermined vicinity of an initial point on the generated path and guide the machine along the generated path.

Consistent with a further aspect of the disclosure, a method is provided for regulating a travel course of a machine. The method includes generating a map of an associated work site. In addition, the method includes receiving data regarding kinematics of the machine. Furthermore, the method includes generating a path along which the machine can travel based on the generated map and machine kinematics. The method further includes generating a plurality of alternative paths, and guiding the machine along one of the generated alternative paths.

DETAILED DESCRIPTION

Figure 1:
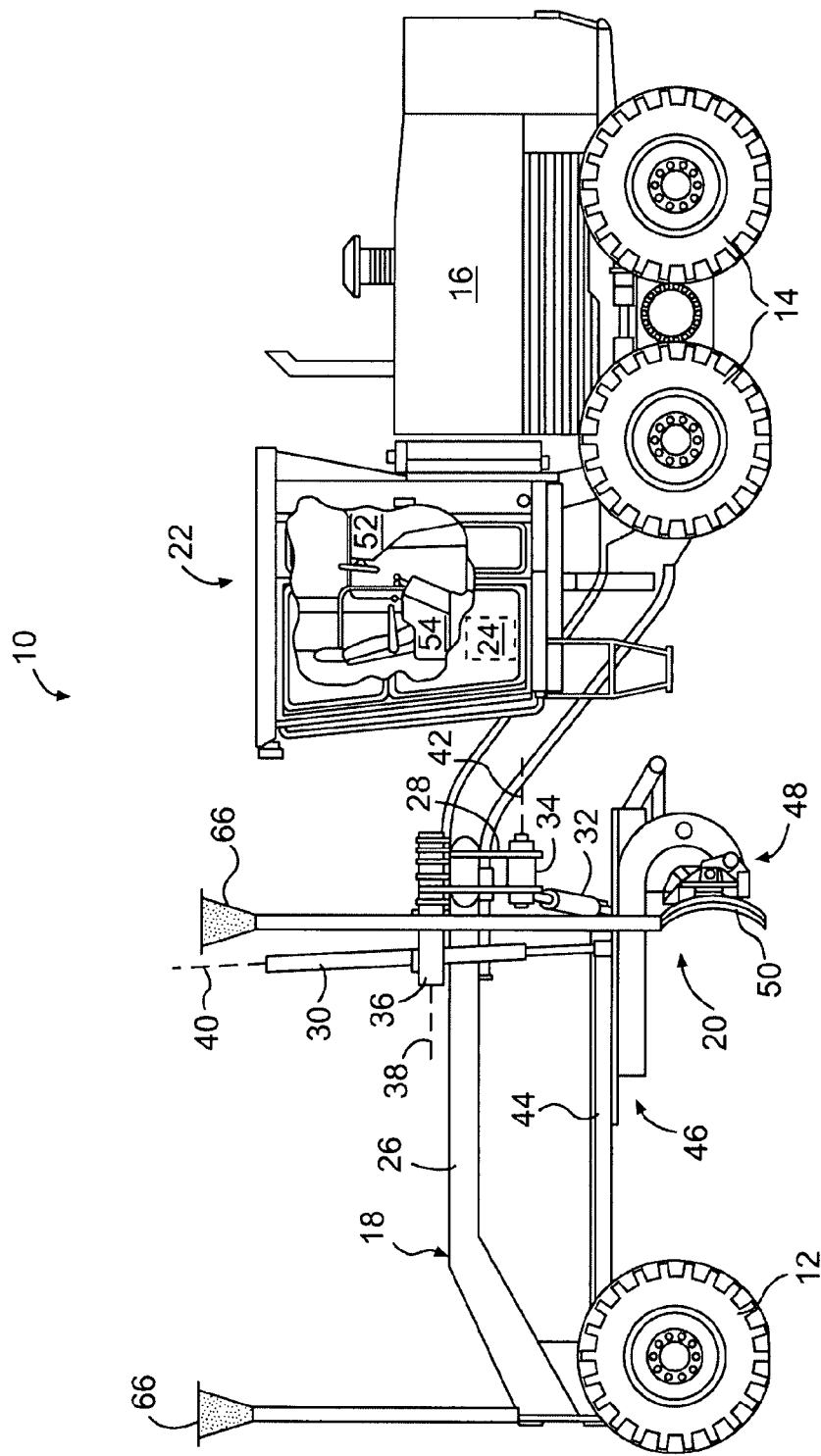
FIG. 1 is a pictorial representation of a side view of an exemplary motor grader.

An exemplary embodiment of a machine 10 is illustrated in FIG. 1. Machine 10 may be a motor grader, a backhoe loader, an agricultural tractor, a wheel loader, a skid-steer loader, or any other type of machine known in the art. Machine 10 may include a steerable traction device 12, a driven traction device 14, a power source 16 supported by driven traction device 14, and a frame 18 connecting steerable traction device 12 to driven traction device 14. Machine 10 may also include a work implement such as, for example, a drawbar-circle-moldboard assembly (DCM) 20, an operator station 22, and a control system 24.

Both steerable and driven traction devices 12, 14 may include one or more wheels located on each side of machine 10 (only one side shown). The wheels may be rotatable and/or tiltable for use during steering and leveling of a work surface (not shown). Alternatively, steerable and/or driven traction devices 12, 14 may include tracks, belts, or other traction devices known in the art. Steerable traction devices 12 may or may not also be driven, while driven traction device 14 may or may not also be steerable. Frame 18 may connect steerable traction device 12 to driven traction device 14 by way of, for example, an articulated joint (not shown). Furthermore, machine 10 may be caused to articulate steerable traction device 12 relative to driven traction device 14 via the articulated joint.

Power source 16 may include an engine (not shown) connected to a transmission (not shown). The engine may be, for example, a diesel engine, a gasoline engine, a natural gas engine, or any other engine known in the art. Power source 16 may also be another source of power such as a fuel cell, a power storage device, or another source of power known in the art. The transmission may be an electric transmission, a hydraulic transmission, a mechanical transmission, or any other transmission known in the art. The transmission may be operable to produce multiple output speed ratios and may be configured to transfer power from power source 18 to driven traction device 14 at a range of output speeds.

Frame 18 may include a beam member 26 that supports a fixedly connected center shift mounting member 28. Beam member 26 may be, for example, a single formed or assembled beam having a substantially hollow square cross-section. The substantially hollow square cross-section may provide frame 18 with a substantially high moment of inertia required to adequately support DCM 20 and center shift mounting member 28. The cross-section of beam member 26 may alternatively be rectangular, round, triangular, or any other appropriate shape.

Center shift mounting member 28 may support a pair of double acting hydraulic rams 30 (only one shown) for affecting vertical movement of DCM 20, a double acting hydraulic ram 32 for affecting horizontal movement of DCM 20, and a link bar 34 adjustable between a plurality of predefined positions. Center shift mounting member 28 may be welded or otherwise fixedly connected to beam member 26 to indirectly support hydraulic rams 30 by way of a pair of bell cranks 36 also known as lift arms. That is, bell cranks 36 may be pivotally connected to center shift mounting member 28 along a horizontal axis 38, while hydraulic rams 30 may be pivotally connected to bell cranks 36 along a vertical axis 40. Each bell crank 36 may further be pivotally connected to link bar 34 along a horizontal axis 42. Hydraulic ram 32 may be similarly pivotally connected to link bar 34.

DCM 20 may include a drawbar member 44 supported by beam member 26 and a ball and socket joint (not shown) located proximal steerable traction devices 12. As hydraulic rams 30 or 32 are actuated, DCM 20 may pivot about the ball and socket joint. A circle assembly 46 may be connected to drawbar member 44 via a motor (not shown) to drivingly support a moldboard assembly 48 having a blade 50. In addition to DCM 20 being both vertically and horizontally positioned relative to beam member 26, DCM 20 may also be controlled to rotate circle and moldboard assemblies 46, 48 relative to drawbar member 44. Blade 50 may be moveable both horizontally and vertically, and oriented relative to circle assembly 46. It is contemplated that DCM 20 may be omitted, if desired, and replaced with a different work implement such as, for example, a ripper, a bucket, a snow plow, or another work implement known in the art.

Operator station 22 may embody an area of machine 10 configured to house the operator. Operator station 22 may include a dashboard 52 and an instrument panel 54 containing dials and/or controls for conveying information and for operating machine 10 and its various components.

Figure 2:
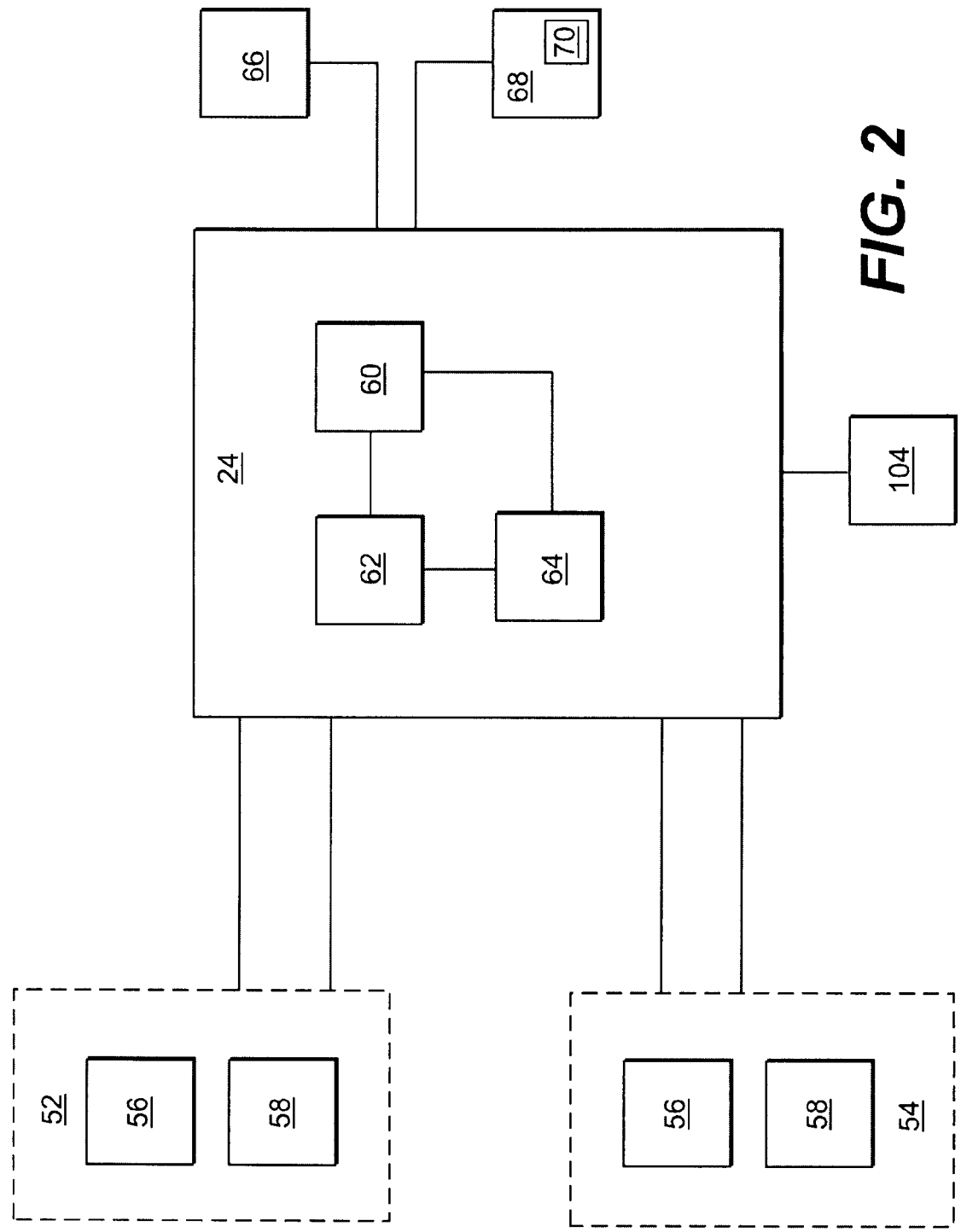
FIG. 2 is a block diagram of an exemplary control system for the motor grader of FIG. 1.

As illustrated in FIG. 2, dashboard 52 and instrument panel 54 may each include a display system 56 and a user interface 58 in communication with control system 24. Each display system 56 may include a computer monitor with an audio speaker, video screen, and/or any other suitable visual display device that conveys information to the operator. It is further contemplated that each user interface 58 may include a keyboard, a touch screen, a number pad, a joystick, or any other suitable input device.

Control system 24 may take many forms including, for example, a computer based system, a microprocessor based system, a microcontroller, or any other suitable control type circuit or system. Control system 24 may include various components for running software applications designed to regulate various subsystems of machine 10. For example, control system 24 may include a central processing unit (CPU), a random access memory (RAM), input/output (I/O) elements, etc. Furthermore, control system 24 may include a position monitor 60, a path generator 62, and a path tracker 64. These components may communicate with each other to adjust an articulation of DCM 20 while guiding machine 10 along a predetermined path within a work site.

Position monitor 60 may receive positioning data from one or more global positioning system (GPS) satellites via at least one GPS receiver 66 to determine the location of machine 10 in relation to a global set of coordinates. In addition, position monitor 60 may transmit data relating to the position of machine 10 to path generator 62 and path tracker 64. Position monitor 60 may be a computer based system and include various components for running software applications designed to determine the position of machine 10. For example, position monitor 60 may include a central processing unit (CPU), a random access memory (RAM), input/output (I/O) elements, etc.

In operation, each GPS receiver 66 may communicate with one or more GPS satellites to determine its position with respect to a selected coordinate system. GPS receivers 66 may be attached to one or more locations on DCM 20. For example, GPS receivers 66 may be placed at opposing ends of DCM 20 to determine the position of each end. By knowing the position of each end of DCM 20, position monitor 60 may determine the orientation and location of DCM 20. In an alternate embodiment, a single GPS receiver 66 may be mounted on DCM 20 to determine the position of DCM 20 relative to the work site.

It is contemplated that position monitor 60 may also receive positioning data from a local positioning unit 68 to supplement GPS receivers 66, if desired. Local positioning unit 68 may enable GPS receivers 66 to more accurately monitor the position of DCM 20. In addition, local positioning unit 68 may be a reference station at or near the work site and may include any system for determining the position of DCM 20 in a coordinate system. Furthermore, local positioning unit 68 may be placed away from machine 10 at a surveyed location with a known position. Local positioning unit 68 may be part of a differential GPS (DGPS), and may include a GPS receiver 70. GPS receiver 70 may be used to determine the position of local positioning unit 68. Any discrepancy between the actual, known position of local positioning unit 68 (as established by survey) and its determined position obtained using GPS receiver 70 may be considered to be error on the part of GPS receiver 70. A correction factor may be generated to compensate for any discrepancy and may be used to correct errors in the determined positions of local positioning unit 68 that are obtained using GPS receiver 70. This correction factor may also be applied to determined positions obtained using other GPS receivers in the vicinity. Accordingly, the correction factor may be used to modify the determined position of DCM 20 that is obtained using GPS receivers 66. Use of this correction factor may enable a more accurate position of DCM 20 to be determined.

Alternatively, local positioning unit 68 may be a laser-based system for determining the position of DCM 20 in the work site. Local positioning unit 68 may include a transceiver (not shown) for communicating with machine 10. Such systems may be used in a similar manner to a differential GPS as discussed above to improve the accuracy of position monitor 60.

Path generator 62 may create a travel path for machine 10 based on known kinematics of machine 10, position data from position monitor 60, and parameters inputted by an operator. Path generator 62 may be a computer based system including various components for running software applications designed to create a travel path for machine 10. For example, path generator 62 may include a central processing unit (CPU), a random access memory (RAM), input/output (I/O) elements, etc.

Figure 3:
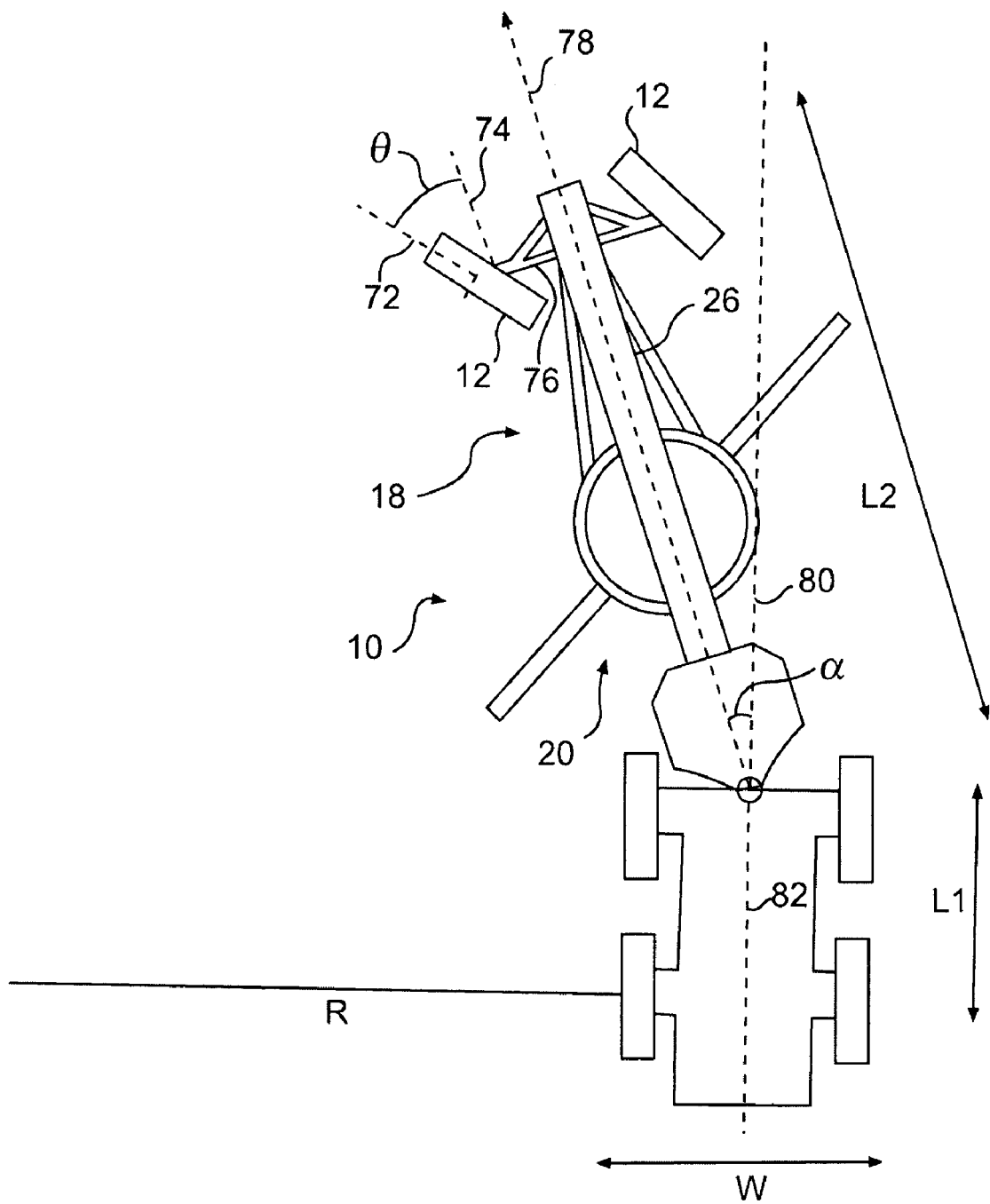
FIG. 3 is a diagrammatic illustration of a top view of an exemplary motor grader.

The kinematics on which the travel path may be based, may be defined by several characteristics of machine 10 illustrated in FIG. 3. Such characteristics may include, for example, a steering angle θ of steerable traction device 12, an articulation angle α of DCM 20, and a steering radius R of machine 10. Steering angle θ may be measured from a vertical plane of symmetry 72 passing midway through steering traction device 12 to a vertical plane 74, which may be substantially orthogonal to steerable traction device axle 76 and generally parallel to a symmetrical mid plane 78 of beam member 26. Articulation angle a may be measured from symmetrical mid plane 78 of beam member 26 to a vertical plane 80, which may be a symmetrical mid-plane of a rear frame 82. Steering angle θ and articulation angle α may be measured parameters. However, steering radius R may be calculated according to Eq. 1 below:

$$R = L_1\ \sin(\alpha) + \xi W\ \cos(\alpha) + \frac{[L_1\ \cos(\alpha) - \xi W\ \sin(\alpha) + L_2]}{\tan(\alpha + \theta)} \quad \text{Eq. 1}$$

where ξ equals 1 when the sum of steering angle θ and articulation angle α is positive, and ξ equals −1 when the sum of steering angle θ and articulation angle α is negative. Furthermore, W is a width of a wheel base of machine 10, L1 is a length of rear frame 82, and L2 is a length of a front frame 84. Once steering radius R is calculated, path generator 62 may incorporate steering radius R into the generation of the path. For example, path generator 62 may base the construction of u-turns on a minimum steering radius R attainable by machine 10.

The position data received from position monitor 60 may relate to the geometry of the work site and be used to generate a map as machine 10 traverses the work site. Such a map may be created by manually driving machine 10 around the work site and recording data points when required. The map may also be created by utilizing local positioning unit 68 and GPS receiver 70 to survey the work site and record data points when required. The data points may include, for example, vertex points spaced along the border of the work site, elevation data describing the terrain of the work site, possible obstacles located on the work site and/or any other data points necessary for defining the work site geometry.

Such vertex points may represent a minimum number of points necessary to define the boundary of the work site. For example, a rectangular work site may be defined by as few as four vertices located at each corner of the work site. A work site having an octagonal shape may be defined by as few as eight vertices located at each corner. Furthermore, work sites having smooth, continuous boundaries may require a large number of vertices to define the contours of the boundary. The vertices may be recorded as GPS receivers 66, 70 and/or local positioning unit 68 travel along the boundary of the work site. Each vertex may be recorded at certain pre-selected points along the edge of the work site. Path generator 62 may use any vertex along the boundary of the work site as an initial point of a potential path. Furthermore, path generator 62 may generate a number of alternate paths equivalent to the number of vertices with each vertex forming an initial point of a path.

In an alternate embodiment, a map describing the geometry of the work site may be pre-made and stored in or downloaded into the memory of path generator 62. In such an embodiment, the map may contain all or some of the data points required to define the geometry of the work site. Any data points that are omitted from the pre-made map may be added by manually driving machine 10 around the work site and/or utilizing local positioning unit 68 and GPS receiver 70 to survey the work site.

The parameters inputted by the operator may include, for example, blade width, the length of overlap each pass may have with other passes, velocity of machine 10, and amount of headland within the boundaries of the work site that is not to be graded. It is contemplated that, in addition to the above parameters, the operator may input a safety zone located at a specified distance beyond the boundary of the work site, if desired. Such a safety zone may be required to account for obstacles such as, for example, ditches and walls. The parameters inputted by the operator may be used in conjunction with kinematics and position data to determine the number of straight passes traversing a work site and locations of u-turns in relation to a boundary of the work site. For example, the blade width and amount of overlap may influence a spacing between straight passes across the work site. In addition, the amount of headland may influence when to terminate a straight pass and begin a u-turn. It is contemplated that the generated passes may be curved rather than straight, if desired.

Figures 4, 5:
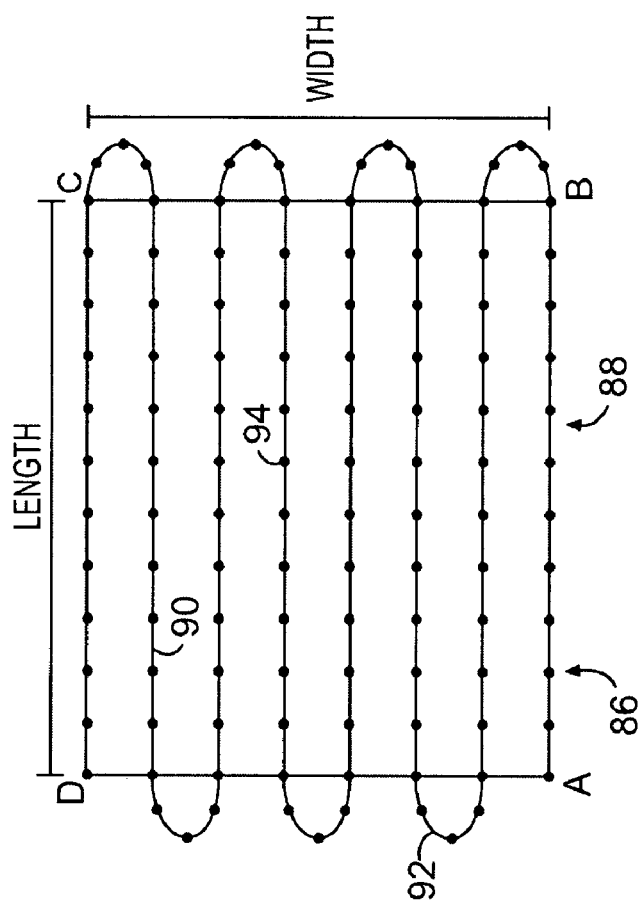
FIG. 4 is a diagrammatic representation of an exemplary travel course for an exemplary motor grader.
FIG. 5 is a diagrammatic representation of an exemplary table utilized to generate the travel course of FIG. 4.

FIG. 4 illustrates an exemplary path 86 generated by path generator 62 for a rectangular work site 88. Work site 88 may have a width of 44 feet, a length of 150 feet and vertices A, B, C, and D located at each corner. Although work site 88 is disclosed having straight-line edges, it is contemplated that work site 88 may have a smooth continuous boundary, if desired. For an exemplary machine 10, width W may be 8.5 feet, rear frame length L1 may be 9 feet, front frame length L2 may be 18 feet, a maximum steering angle θ may be 22 degrees, a maximum articulation angle α may be 20 degrees, the width of blade 50 may be 10 feet, an overlap of 2 feet between straight passes may be desired, and there may be no headland within the boundaries of work site 88. Furthermore, a minimum steering radius of machine 10 may be calculated to be 37.22 feet.

Based on the above-mentioned parameters, path generator 62 may determine the components of path 86 originating at vertex A and side AB. Path generator 62 may determine that the 44 foot wide work site may accommodate eight straight passes 90 being ten feet wide with each pass 90 overlapping by two feet. Furthermore, each pass may be 6 feet apart representing the travel course of the center of blade 50. Straight passes 90 may be connected to each other by u-turns 92. Because the minimum steering radius R of machine 10 may be 37.22 feet, u-turns 92 may have radii of 37.22 feet.

Path generator 62 may generate a plurality of target points 94 spaced at regular intervals along path 86. Target points 94 may provide an immediate objective for machine 10 to reduce deviations from path 86. The distance between each point may vary depending on the velocity of machine 10 and terrain of work site 88. For example, the distance between target points 94 may be greater when the velocity of machine 10 is greater and the surface of work site 88 is relatively flat due a decreased likelihood of straying from pass 90. However, the distance between target points 94 may be less if the velocity of machine 10 is lower and the surface of work site 88 is uneven because of an increased the likelihood of straying from pass 90.

It should be understood that for some work sites 88, path 86 may be sub-optimal. In order to help ensure an optimal path 86 is generated for a particular work site, path generator 62 may create a table 96 offering multiple options for traversing work site 88. FIG. 5 illustrates an exemplary table 96 listing multiple parameters, which may be used to select a suitable option for traversing work site 88. Such parameters may include, for example, the vertex at which path 86 may begin, the edge of work site 88 at which path 86 may begin, the number of straight passes 90 required for grading work site 88, the average length of straight passes 90, and/or any other parameter useful for selecting an option for traversing work site 88. An operator may select a particular option for traversing work site 88 or defer the decision to path generator 62. When selecting the most optimal option, either the operator or path generator 62 may select the option based on such criteria as, for example, fewest turns, shortest period of time for completion of the path, fewest obstacles along the path, and/or any other criteria that may produce the most optimal path. It should be understood that certain criteria might have a higher priority than other criteria. Such priority may be chosen by the operator or pre-programmed into the software of path generator 62.

Path tracker 64 may guide machine 10 along a predetermined path and may operate in an initialization mode and a path tracking mode. In the initialization mode, path tracker 64 may use position data from position monitor 60 to create a path from a current location of machine 10 to an initial point of path 86. In the path tracking mode, path tracker 64 may use position data from position monitor 60 to guide machine 10 along the path created by path tracker 64 and/or path 86 created by path generator 62. In addition, path tracker 64 may include various components for running software applications designed to guide machine 10 along a predetermined path. For example, path tracker 64 may include a central processing unit (CPU), a random access memory (RAM), input/output (I/O) elements, etc.

Path tracker 64 may operate in the initialization mode when machine 10 is positioned at a location away from a starting point of path 86 and/or the orientation of machine 10 conflicts with an initial orientation required by path 86. In the initialization mode, path tracker 64 may use position data from position monitor 60 to create a path from the current location of machine 10 to the initial point of path 86. Path tracker 64 may apply any number of algorithms or mathematical equations to the position data to create a smooth path between the current location of machine 10 and the initial position of path 86. It should be understood that when machine 10 is positioned at the starting point of path 86 but has an orientation in conflict with the initial orientation required by path 86, the smooth path generated may originate and terminate at the same point. It is contemplated that path generator 62 may create the path used to position machine 10 at the initial point of path 86 instead of path tracker 64, if desired. In such configuration, path tracker 64 may only operate in path tracking mode.

Figure 6:
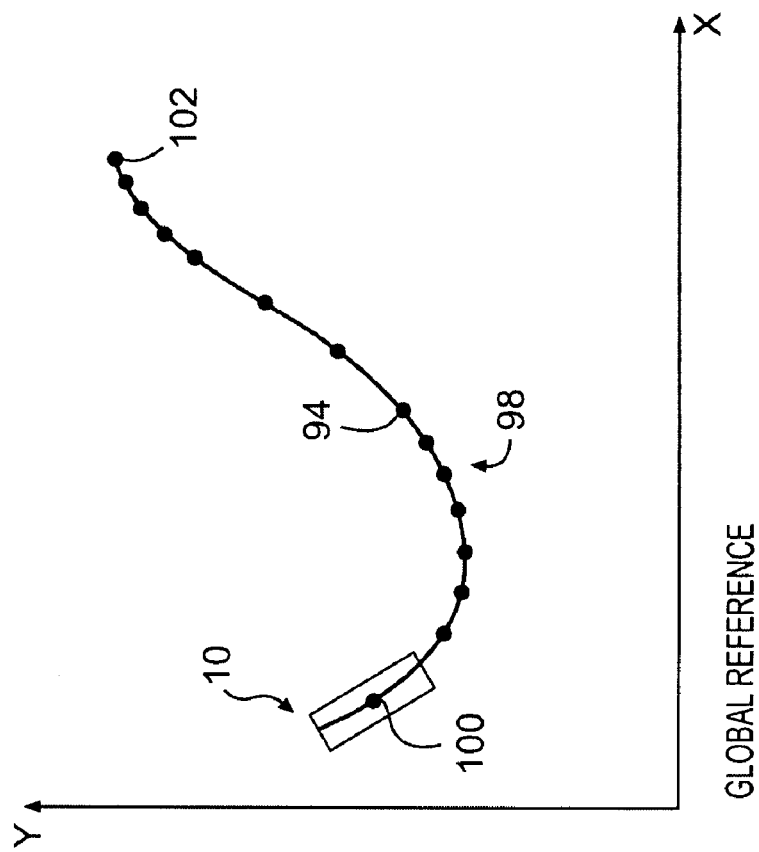
FIG. 6 is a graphical representation of an algorithm for guiding an exemplary motor grader.

FIG. 6 illustrates an exemplary path 98 created by path tracker 64. Current position point 100 may represent the current position of machine 10. Furthermore, path starting point 102 may represent the initial point of path 86. The location of current position point 100 may be determined by position monitor 60 and placed in a global X-Y coordinate system. The location of path starting point 102 on the global X-Y coordinate system may already be known from data created by path generator 62. A smooth path from current position point 100 to path starting point 102 may be created by applying a third degree polynomial to the position data. The exemplary path 98 may be represented by a third degree polynomial according to Eq. 2-5 below:

$$y = ax^3 + bx^2 \qquad \text{Eq. 2}$$

$$m = \frac{x_2 - x_1}{y_2 - y_1} \qquad \text{Eq. 3}$$

$$b = \frac{3y_1 - mx_1}{(x_1)^2} \qquad \text{Eq. 4}$$

$$a = \frac{y_1 - bx}{(x_1)^3} \qquad \text{Eq. 5}$$

where m is the slope of the curve, $x_1$ and $y_1$ are the x and y coordinates of the current position of machine 10 on the x-y coordinate axis, $x_2$ and $y_2$ are the x and y coordinates of the desired future position of machine 10, and a, b, c, and d are dimensionless coefficients. It is contemplated that although exemplary path 98 embodies a third degree polynomial, any type of equation or algorithm may be applied to the position data to ensure a smooth path between the two positions.

Target points 94 have been placed on path 98 to provide an immediate objective for machine 10 to reduce deviations from path 98. The distance between target points 94 may be based on the geometry of the generated path. For portions of path 98 having smaller radii, the distances between target points 94 are smaller. For portions of path 98 having greater radii, the distances between target points 94 are greater.

Path tracker 64 may operate in the path tracking mode when machine 10 is traveling along a predetermined path. In the path tracking mode, path tracker 64 may utilize any number of algorithms designed to keep machine 10 traveling along the predetermined path. Furthermore, path tracker 64 may send signals to a steering system 104 based on calculations made by the algorithm. Such signals may adjust steering angle θ and articulation angle α. In order to simplify calculations, the steering of machine 10 may be primarily accomplished by adjusting steering angle θ. If an adjustment of steering angle θ is insufficient to achieve the desired steering radius, then path tracker 64 may also adjust articulation angle α. It is contemplated that the steering of machine 10 may alternatively be primarily accomplished by adjusting articulation angle α or that the steering of machine 10 may be accomplished by adjusting a combination of both steering angle θ and articulation angle α.

Figure 7:
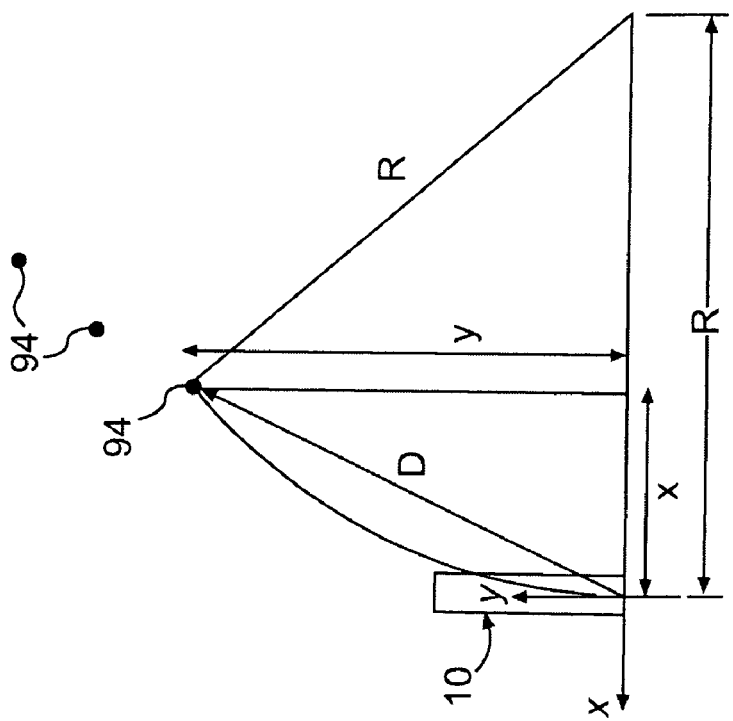
FIG. 7 is another graphical representation of an algorithm for guiding an exemplary motor grader.

FIG. 7 illustrates an exemplary operation of path tracker 64 using a pure pursuit algorithm. Pure pursuit may operate by guiding machine 10 toward a series of intermediate target points 94 positioned along a path until the end of the path is reached. Machine 10 may be kept on the path by adjusting a steering radius R of machine 10 in relation to an orientation of machine 10 and a look-ahead distance D. The orientation of machine 10 may be defined by an X-Y coordinate system originating at a mid-rear portion of rear frame 82 of machine 10 and based on position data from position monitor 60. The X and Y axes may generally be perpendicular and parallel to the direction machine 10 is traveling, respectively. In addition, look-ahead distance D may be defined by the distance between the current position of machine 10 and the next target point 94 on the path. Look-ahead distance D may be measured from a mid-rear portion of rear frame 82 of machine 10. It should be understood that in addition to look-ahead distance D, steering radius R may originate at the origin of the X-Y coordinate system defining the orientation of machine 10.

Path tracker 64 may calculate the required steering radius according to either Eq. 6 or Eq. 7 below:

$$R = \sqrt{x^2 + (R-y)^2} \quad \text{Eq. 6}$$

$$R = \frac{D^2}{2y} \quad \text{Eq. 7}$$

where R is the required steering radius, D is the look-ahead distance, x is the perpendicular component of the look-ahead distance in the X-Y coordinate system, and y is the parallel component of the look-ahead distance in the X-Y coordinate system. Upon calculating the required steering radius, path tracker 64 may calculate steering angle θ and articulation angle α by performing iterations of Eq. 1 and Eq. 2 disclosed above.

For example, using the exemplary machine 10 of FIG. 3, if the mid-rear portion of machine 10 were 20 feet away from the next target point 94 and machine 10 were oriented to travel in a direction deviating from the path leading to target point 94 by approximately 7 degrees, the steering radius required to guide machine 10 to the next target point 94 would be approximately 82 feet. Upon determining steering radius R, Eq. 1 and Eq. 2 may be iterated to determine that steering angle θ may be 18.75 degrees and articulation angle α may be 0 degrees for a steering radius of 82 feet. It should be noted that, because 18.75 is less than the maximum steering angle θ, which is 22 degrees, articulation angle α must be zero degrees.

Referring back to FIG. 2, path tracker 64 may communicate with steering system 104 to adjust the course of machine 10. Steering system 104 may adjust the course of machine 10 based on signals transmitted by path tracker 64. In addition, steering system 104 may adjust the course of machine 10 based on input from an operator via an operator input device (not shown) such as, for example, a joystick, steering wheel, or any other device capable of converting input from an operator to a course adjustment of machine 10. Steering system 104 may be any type of steering system such as, for example, a skid-steer type steering system or all-wheel steering. Furthermore, steering system 104 may include any clutches (not shown) and/or brakes (not shown) necessary to adequately adjust the course of machine 10.

Figure 8:
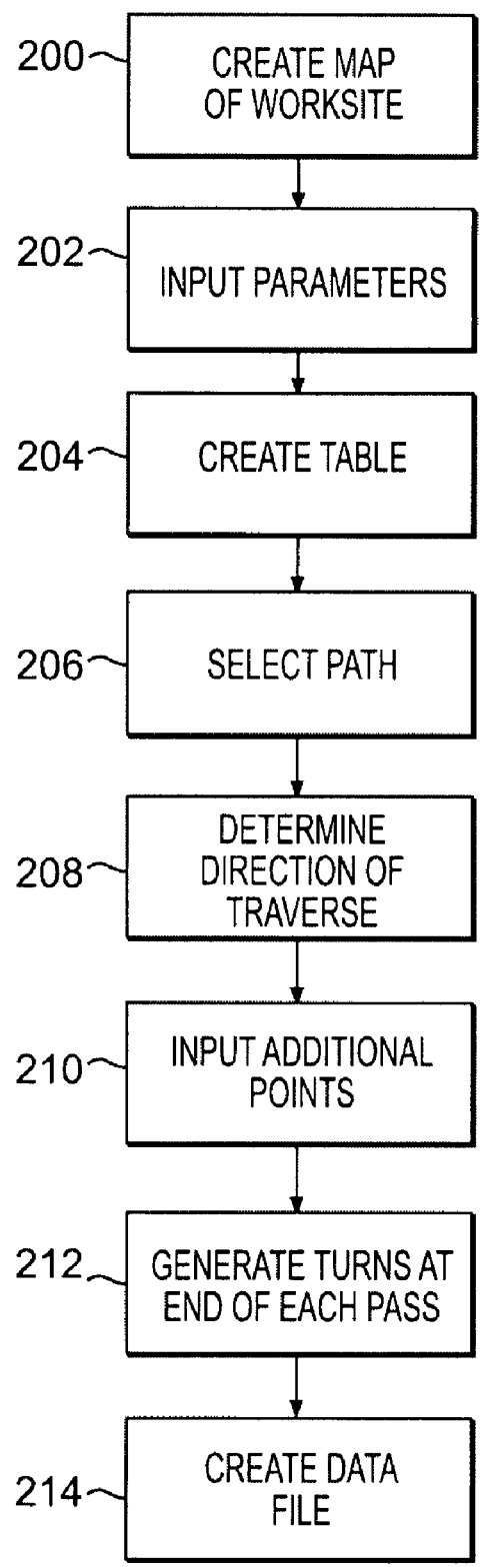
FIG. 8 is a flow diagram and associated illustration of an exemplary disclosed method for generating a path for a motor grader.
Figure 9:
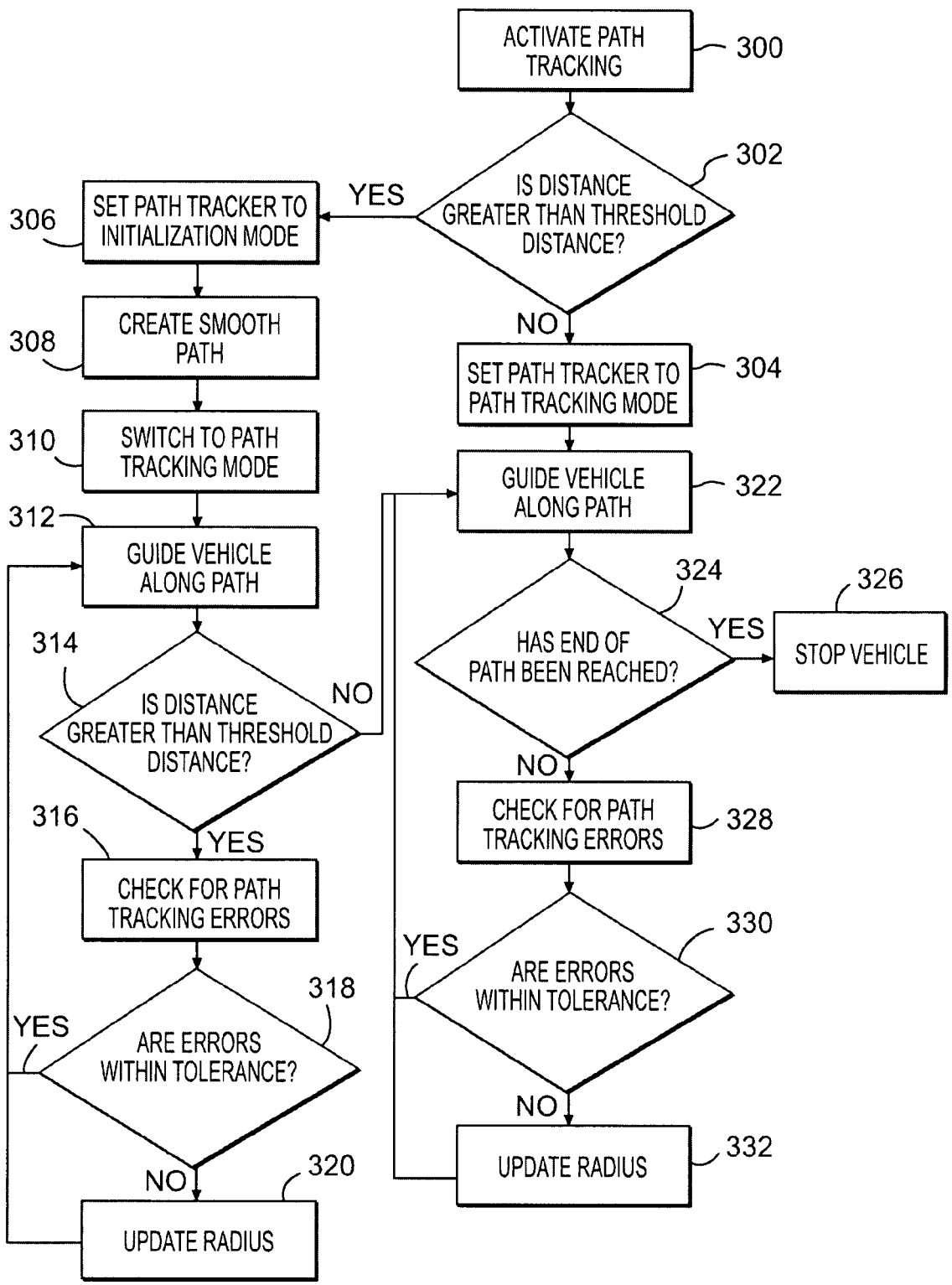
FIG. 9 is a flow diagram of an exemplary disclosed method for guiding a motor grader.

FIGS. 8 and 9, which are discussed in the following section, illustrate the operation of machine 10 utilizing embodiments of the disclosed system. FIG. 8 illustrates an exemplary method used to generate a path for traversing a work site. FIG. 9 illustrates an exemplary method for guiding machine 10 along the generated path.

INDUSTRIAL APPLICABILITY

The disclosed system may ensure that a motor grader or other excavation machine may automatically traverse a work site allowing an operator of the machine to concentrate on making complex cuts with machine implements. Optimal path planning may be automatically accomplished by a path generator, which may utilize GPS receivers located on the motor grader. A steering system and path tracker may utilize the GPS coordinates to track the machine and apply control methods to correct its course of travel in real time. Such equipment may free the operator from steering responsibilities and allow the operator to concentrate on sculpting the work area to predetermined specifications. The operations of path generator 62 and path tracker 64 will now be explained.

FIG. 8 illustrates a flow diagram depicting an exemplary method of path generation. The method may begin by creating a map of a work site 88 (step 200). In one exemplary embodiment, the map may be created by utilizing a global positioning system to survey work site 88. Various vertex points A, B, C, D defining the geometry of work site 88 may be inputted into path generation system 62. In another exemplary embodiment, the map may be created by manually driving machine 10 around work site 88 and recording data points when required. It should be understood that work site 88 need not be restricted to having straight-line edges. Maps may be created for work sites having smooth, continuous boundaries, such as, for example, golf courses and curved roads. In an alternate embodiment, the map of work site 88 may be pre-made and may be downloaded to path generator 62.

When the map has been created or downloaded, the operator may input various parameters related to path generation and machine kinematics such as, for example, blade length, overlap of traverses, desired velocity of machine 10, and headland not to be excavated into path generator 62 (step 202). Once the parameters have been entered, path generator 62 may create a table 96 with several options for traversing work site 88 (step 204). Table 96 may include various parameters such as, for example, initial vertex point, initial edge of work site 88, number of passes traversing work site 88, or any other parameter that may be relied upon when selecting an optimal path. It should be understood that table 96 may use all vertices and edges of work site 88 as initial vertex points and initial edges to create every possible option for traversing work site 88.

After table 96 is created, the operator may select an optimal path from the several options (step 206). The selection may be made based on different criteria with each criterion being assigned a different level of priority. For example, the cost function of a path may be the dominant criterion. Because cost function may be related to the number of u-turns required by machine 10 to cover work site 88, the operator may choose the option with the least number of passes. It is contemplated that the operator may choose to defer the selection of an optimal option to path generator 62, if desired. Path generator 62 may select an optimal option based on criteria programmed by the operator or criteria stored in the memory of path generator 62. Furthermore, priority assigned to each criterion may be chosen by the operator or pre-programmed into the software of path generator 62.

After an optimal pass is chosen, path generator 62 may determine which direction machine 10 may traverse each straight pass (step 208). Once the direction of each pass is determined, target points 94 may be inputted for each straight pass 90 (step 210). Target points 94 may be used by path tracker 64 to guide machine 10 along the generated path. Once all target points 94 are inputted, turns 92 at the end of each pass may be generated (step 212). After the entire path is generated, a data file may be created for use by path tracker 64 (step 214).

It is contemplated that a safety zone may be provided defining a boundary around work site 88. An obstacle such as, for example, a ditch or a wall, might be present beyond the safety zone boundary. In such a situation, path tracker 64 may switch steering controls from automatic to manual if a u-turn is not possible. The operator may perform a switchback turn manually and then reinstate path tracker 64.

FIG. 9 illustrates a flow diagram depicting an exemplary method of path tracking. The method may begin when the operator activates path tracker 64 via user interface 58 (step 300). Path tracker system 64 may reference the data file created by path generator 62 and GPS data relating to the location of machine 10 to determine if the distance and/or orientation between machine 10 and the initial vertex point and position of the generated path is greater than a threshold distance and/or orientation (step 302). For example, the threshold distance may be approximately one foot and the threshold orientation may be approximately five degrees.

If the distance and/or orientation angle between machine 10 and the initial vertex point of the generated path is less than the threshold distance and/or orientation angle (step 302: No), then path tracker 64 may be set to path tracking mode (step 304). If the distance and/or orientation angle between machine 10 and the initial vertex point of the generated path is greater than the threshold distance and/or orientation angle (step 302: Yes), then path tracker 64 may be set to an initialization mode (306).

In the initialization mode, path tracker 64 may create a smooth path between the current position of machine 10 and the initial position suggested by path generator 62 (step 308). It should be understood that when machine 10 is located within the threshold distance of the initial vertex point and the orientation angle of machine 10 exceeds the threshold orientation angle, the path generated by path tracker 64 may originate and terminate at about the same general point. It is contemplated that the smooth path may be based on a third degree polynomial, if desired. Upon generating a smooth path to the initial vertex point, path tracker 64 may be switched to path tracking mode (step 310). In path tracking mode, path tracker 64 may guide machine 10 toward the initial vertex point according to a path tracking algorithm such as, for example, pure pursuit tracking (step 312).

While guiding machine 10 along the smooth path, path tracker 64 may reference position data from position monitor 60 to determine if the distance and/or orientation angle between machine 10 and the initial vertex point of the generated path is greater than the threshold distance (step 314). If the distance and/or orientation angle between machine 10 and the initial vertex point of the generated path is less than the threshold distance and/or orientation angle (step 314: No), then path tracker 64 may guide machine 10 along the path generated by path generator 62 according to a path tracking algorithm such as, for example, pure pursuit tracking (step 322).

If the distance and/or orientation angle between machine 10 and the initial vertex point of the generated path is greater than the threshold distance and/or orientation angle (step 314: Yes), then path tracker 64 may check for path tracking errors such as, for example, heading errors, lateral errors, and whether machine 10 has traveled at a fixed turning radius a longer than desired period of time (step 316). The magnitude of heading errors may be the magnitude of an angle between the current machine heading and a tangent of the path. In addition, the magnitude of the lateral error may be the distance between the current position of the center of blade 50 and the position at which blade 50 should be, as suggested by the generated path. Path tracker 64 may compare the magnitude of the errors to a predetermined tolerance range (step 318). For example, the predetermined tolerance for heading error and lateral error may be about five degrees and one foot, respectively. If path tracker 64 determines that the magnitude of all of the determined errors are within the range (step 318: Yes), then machine 10 may continue traveling and step 312 may be repeated.

However, if path tracker 64 determines that the magnitude of any error is outside of the range (step 318: No), then path tracker 64 may update the steering radius of machine 10 as required by the algorithm (step 320). Path tracker 64 may then repeat steps 312 through 320 until the distance between machine 10 and the initial vertex point of the generated path is less than the threshold distance.

While path tracker 64 guides machine 10 along the path generated by path generator 62 (step 322), path tracker 64 may determine if the end of the path has been reached (step 324). If the end of the path has been reached (step 324: Yes), then path tracker 64 may stop machine 10 (step 326).

However, if path tracker 64 determines that the end of the path has not been reached (step 324: No), then path tracker 64 may check for path tracking errors such as, for example, heading errors, lateral errors, and whether machine 10 has traveled at a fixed turning radius for a longer than desired period of time (step 328). The magnitude of heading errors may be the magnitude of an angle between the current machine heading and a tangent of the path. In addition, the magnitude of the lateral error may be the distance between the current position of the center of blade 50 and the position blade 50 should be as suggested by the generated path. Path tracker 64 may compare the magnitude of the errors to a predetermined tolerance range (step 330). For example, the predetermined tolerance for heading error and lateral error may be five degrees and one foot, respectively. If path tracker 64 determines that the magnitude of all of the determined errors are within the range (step 330: Yes), then machine 10 may continue traveling and step 322 may be repeated.

However, if path tracker 64 determines that the magnitude of any error is outside of the range (step 330: No), then path tracker 64 may update the steering radius of machine 10 as required by the algorithm (step 332). Path tracker 64 may then repeat steps 322 through 332 until the end of the path has been reached.

Generating maps of a work site rather than using pre-existing maps may increase the flexibility and efficiency of the motor grader. In particular, the system may not be limited by a finite library of maps, which can restrict the number and variety of work sites open the motor grader's automatic driving capability. Furthermore, generating maps from which the paths are based reduces the size of or eliminates the need for a map library. Without the need for a map library, computer storage space may be made available for other types of data useful for grading work sites. Also, without the need for a map library, the control system may require less memory, which may lead to a reduction of costs.

By offering a plurality of options for traversing the work site from which the operator may choose, the path generator may be able to create the most optimal path for a greater variety of work sites. In particular, different work sites may have different requirements, which may affect the layout of the path. For example, the most optimal path for a particular work site may have a minimal number of straight passes. However, the most optimal path for another work site, might originate from a particular point and may have more than the minimal possible straight passes.

Misalignment and path deviation errors may be reduced by the path tracker's ability to guide the machine to an initial position and orientation suggested by the path generator. An automatic mechanism for positioning the motor grader may ensure that the number of errors made grading a work site are reduced. Such reduction in errors may increase efficiency and reduce construction costs.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A system for regulating a travel course of a machine through a site, the system comprising:
   a steering system operationally connected to at least one ground engaging device; and
   a path generator configured to (i) obtain data indicative of a geometry of the site, (ii) generate multiple paths along which the machine can travel through the site based at least in part on the data, the multiple paths differing from one another and each traversing about an entirety of the site, (iii) receive an indication as to which one of the multiple paths is selected for travel by the machine, and (iv) generate a plurality of target points along the selected path to guide the machine along the selected path; and
   a path tracker configured to automatically regulate the steering system to guide the machine along the selected path.

2. The system of claim 1, wherein the path tracker is further configured to automatically regulate the steering system to orient the machine to a predetermined orientation relative to an initial point on the selected path.

3. The system of claim 1, wherein the path tracker is further configured to release steering control to an operator when the machine travels beyond a specified threshold.

4. The system of claim 1, wherein the path generator is further configured to automatically select an optimal path from the multiple paths.

5. The system of claim 1, wherein the path generator is configured to receive an operator selection of a desired one of the multiple paths.

6. The system of claim 1, wherein the path generator is configured to generate the multiple paths based at least in part on a map of the site generated from the data, the map including points defining at least a boundary surrounding the site.

7. The system of claim 1, wherein the selected path is substantially continuous, and defines a plurality of passes through the site and at least one u-turn connecting at least one pair of the plurality of passes.

8. The system of claim 7, wherein at least one pair of adjacent passes of the plurality of passes overlap.

9. The system of claim 1, wherein the data is indicative of terrain at the site.

10. The system of claim 1, wherein the path generator is further configured to obtain data indicative of at least one of a steering radius, a steering angle, and an articulation angle of the machine, and generate the path based at least in part on the data.

11. A machine comprising:
    at least one ground engaging device;
    a power source configured to generate a power output for driving the at least one ground engaging device;
    a steering system operationally connected to at least one ground engaging device;
    a path generator configured to:
    generate a plurality of substantially continuous paths along which the machine can travel through a site, each of the generated paths including a plurality of passes through the site, differing from one another, and covering about an entirety of the site,
       receive an indication of which of the plurality of paths is selected for travel by the machine, and
       generate a plurality of target points along the selected path to guide the machine along the selected path; and
       a path tracker configured to automatically regulate the steering system to guide the machine along the selected path.

12. The machine of claim 11, wherein the path generator is further configured to automatically select an optimal path from the plurality of paths.

13. The machine of claim 11, wherein the path generator is further configured to receive an operator selection of a desired one of the plurality of paths.

14. The machine of claim 11, wherein the path generator is configured to generate the plurality of paths based at least in part on a map of the site, the map including points defining at least a boundary surrounding the site.

15. The machine of claim 11, wherein the path tracker is further configured to release steering control to an operator when the machine travels beyond a specified threshold.

16. The machine of claim 11, wherein the selected path includes at least one u-turn connecting at least one pair of the plurality of passes.

17. The machine of claim 16, wherein the ground engaging device is configured to engage portions of the site during at least one pair of adjacent passes of the plurality of passes, and the engaged portions overlap.

18. The machine of claim 11, wherein the path generator is configured to obtain data indicative of at least one of a steering radius, a steering angle, and an articulation angle of the machine, and generate the substantially continuous path based at least in part on the data.

* * * * *